Aug. 21, 1956

D. A. POTTER ET AL 2,759,802

PURGING GAS GENERATOR

Filed Dec. 9, 1952

Inventors:
Donald A. Potter
Henry A. Geisler
By Ahlberg, Nupper & Gradolph
Attorneys Aug. 21, 1956  D. A. POTTER ET AL  2,759,802
PURGING GAS GENERATOR Filed Dec. 9, 1952  5 Sheets-Sheet 3

Inventors:
Donald A. Potter
Henry A. Geisler
By Ahlberg, Wupper & Gradolph
Attorneys

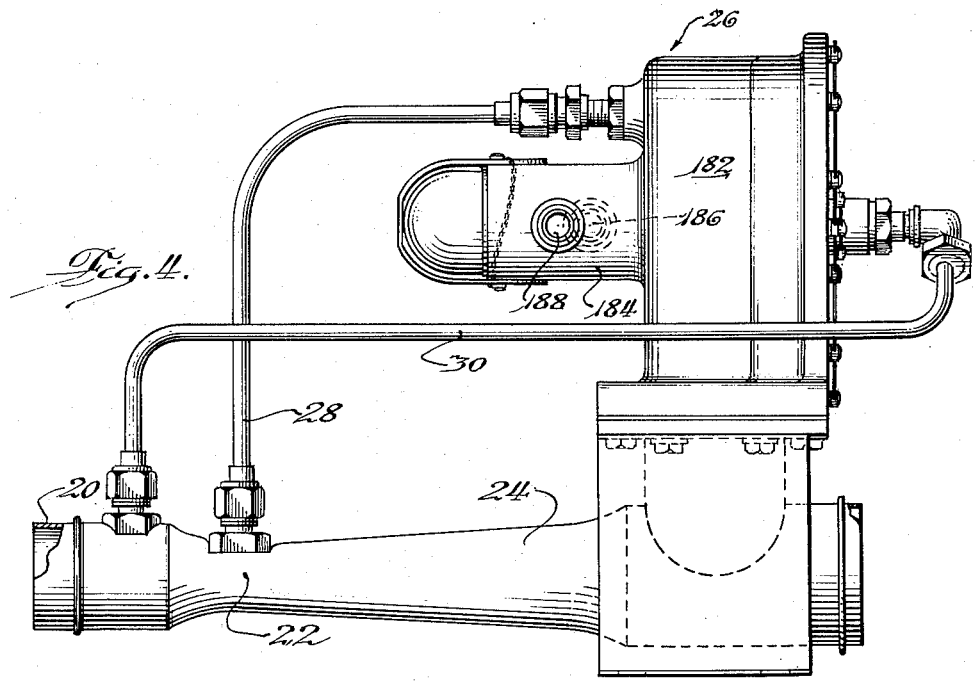
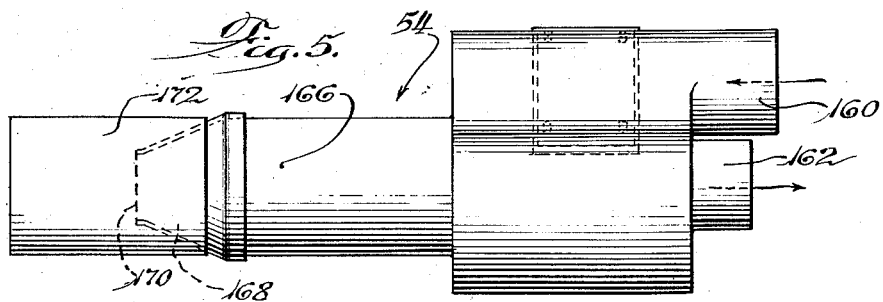
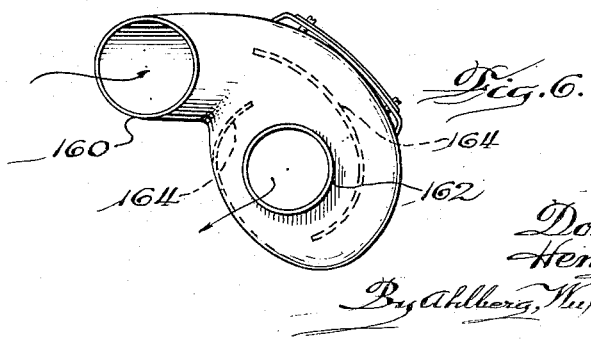

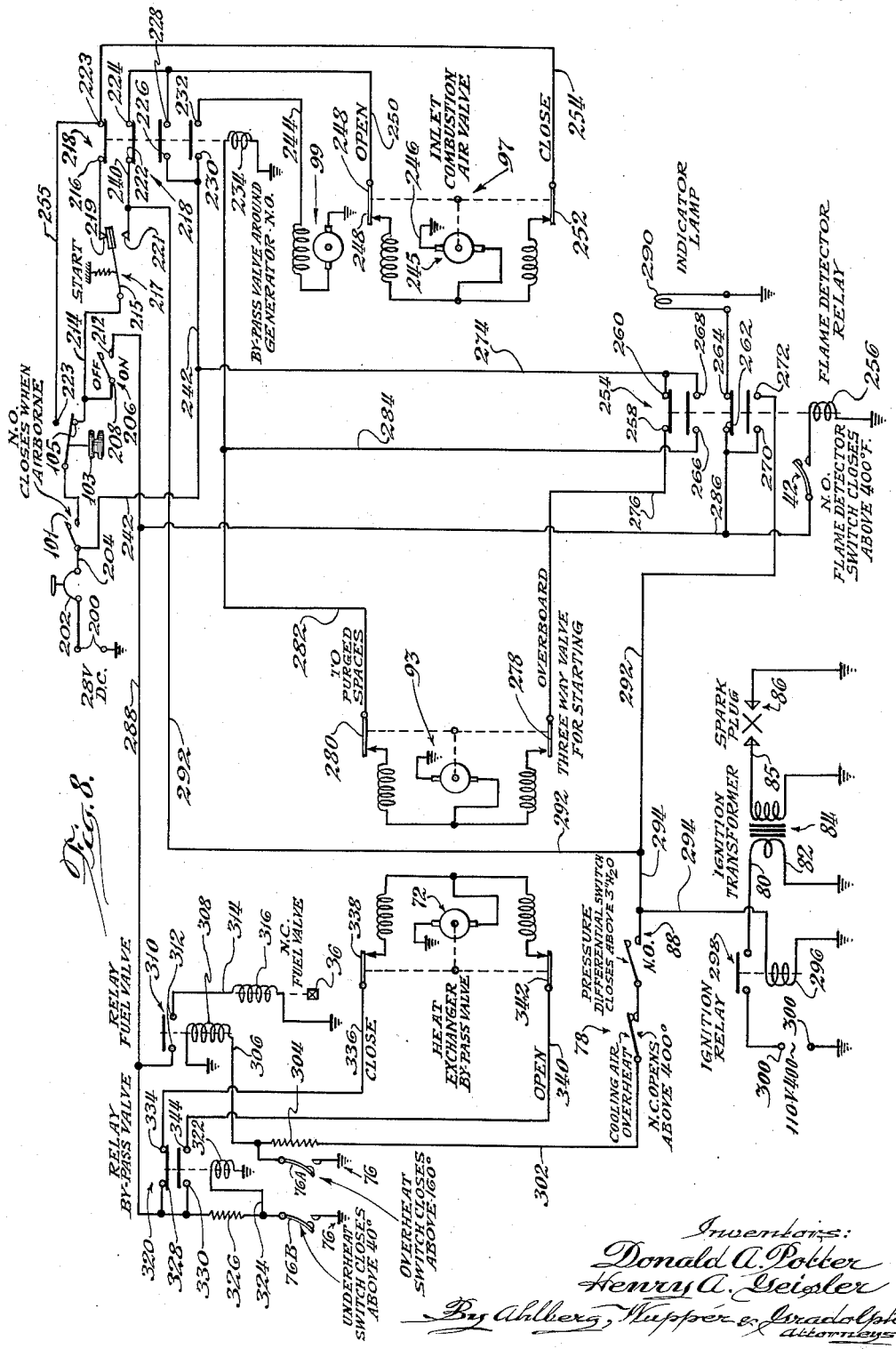

United States Patent Office

2,759,802
Patented Aug. 21, 1956

2,759,802

PURGING GAS GENERATOR

Donald A. Potter and Henry A. Geisler, Indianapolis, Ind., assignors to Stewart-Warner Corporation, Chicago, Ill., a corporation of Virginia Application December 9, 1952, Serial No. 324,974

10 Claims. (Cl. 23—281)

The present invention relates generally to the art of fire and explosion prevention primarily upon aircraft and especially military aircraft. Although the invention has other applications as will appear, it will be described in connection with a system and apparatus for preventing fires and explosions in military aircraft of the jet powered type.

A portion of the system illustrated and described herein forms the subject matter of a related copending patent application by Henry A. Geisler, Serial No. 343,373, filed March 19, 1953.

Within any aircraft there is much closed space, or substantially closed space, which is not occupied by personnel and within which fuel vapors may collect. These vapors when mixed with the air in the space present an explosion hazard. Contrary to what might be supposed, this hazard is generally considered to be greater with jet aircraft than with reciprocating engine powered aircraft. This is particularly true within the fuel cells of the aircraft wherein the vaporization of gasoline normally expels the air quite quickly thereby producing an atmosphere too rich to burn. On the other hand, jet fuels have a lower vapor pressure than gasoline and it is usual, therefore, for a jet aircraft on the ground to have air present in the fuel cells in such quantities that the mixture above the fuel level is too lean to burn or explode. As the aircraft rises, however, the progressively lower barometric pressure encountered causes more rapid fuel vaporization such that at high levels of operation the mixture within the fuel cells is too rich to burn. Somewhere between these extremes, however, the aircraft passes through a zone where the atmosphere above the level of the fuel in the fuel cells is in an extremely dangerous condition. Furthermore, particularly in military aircraft, perforation of the fuel cells such as is brought about frequently by enemy action permits fuel to spill into the wings and vaporize therein, thus producing a hazardous condition. One method of preventing hazards of this type to a great extent is to purge these spaces unoccupied by personnel but where fuel may accumulate, by a continuous flow of a gas which will not support combustion, thereby driving out of these spaces substantially all of the air. It is the principal object of the present invention to provide a novel efficient and lightweight system and the necessary equipment in the quantity and quality needed for this purpose.

Another object is to provide novel equipment for the purpose set forth which operates by taking the ordinary jet engine fuel with which the aircraft is supplied and burning this fuel in air under carefully controlled conditions so as to provide noncorrosive products of combustion at the proper temperature and pressure which are extremely high in carbon dioxide and nitrogen concentration and which have an extremely low oxygen content.

Yet another object is to accomplish this by providing equipment which will function for the desired purpose throughout an extremely wide range of altitude, speed, and temperature conditions.

Still another object is to provide equipment for the purpose set forth which is completely safe and automatic in operation and which will "fail safe" if any portion of the equipment malfunctions.

Still another object is to provide equipment of the type set forth which is specifically adapted for operation in conjunction with a jet engine power plant of the type customarily used in such aircraft.

Other objects and advantages will become apparent from the following description of a preferred embodiment of our invention which is illustrated in the accompanying drawings.

In the drawings, in which similar characters of reference refer to similar parts throughout the several views:

Fig. 4 is a fuel air ratio controller forming a portion of the apparatus of Fig. 1 shown in side elevation;

Fig. 5 is a side view of a carbon and water separator forming a portion of the apparatus;

Fig. 6 is an end view of the apparatus of Fig. 5;

Fig. 7 is a side view of a bypass valve forming a portion of the apparatus; and

Fig. 8 is an electrical wiring diagram illustrating the system for operating and controlling the mechanical equipment.

Figure 1:
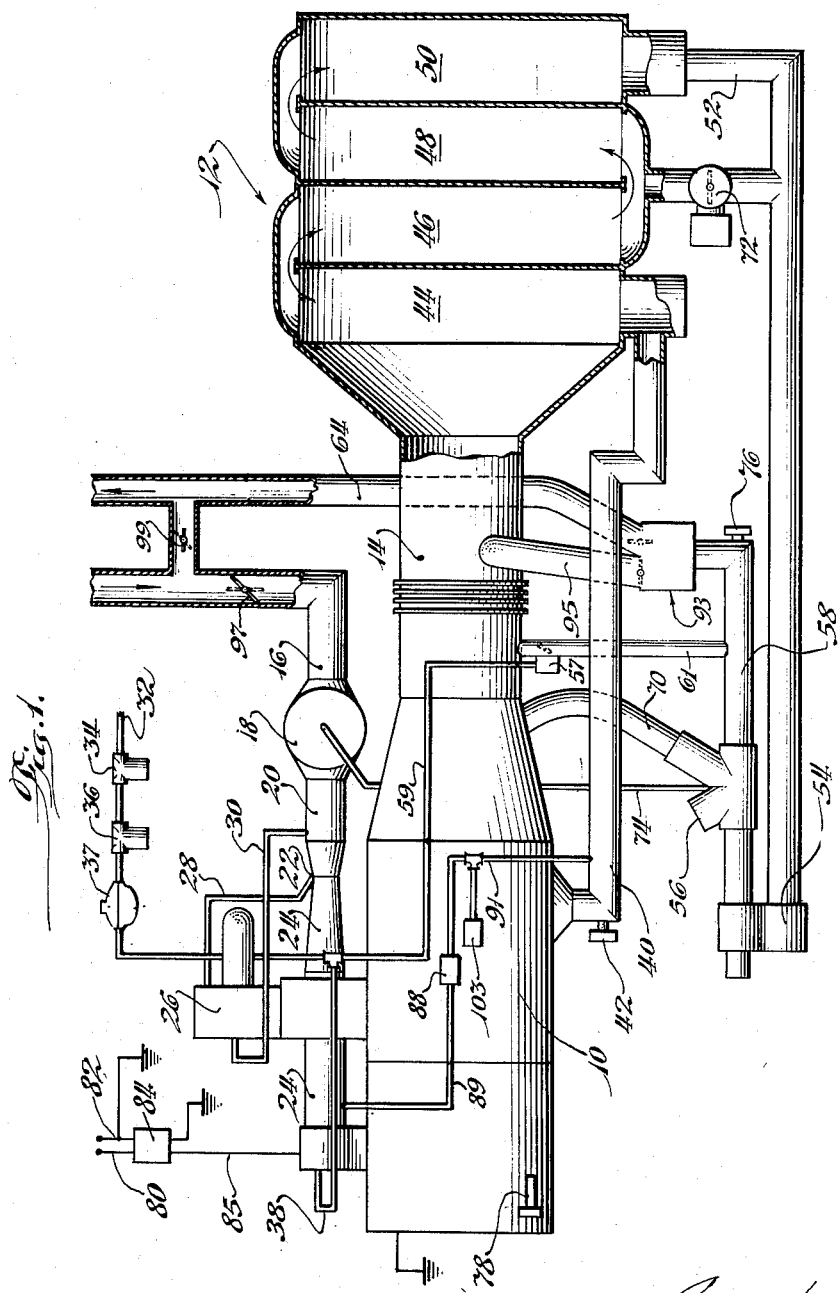
Fig. 1 is a diagrammatic representation, illustrating the general organization and layout of the several elements which make up the apparatus of the present invention.

As is usual with aircraft equipment, weight and space requirements as well as cost can be reduced to a minimum if full use is made of the facilities already necessarily available in the aircraft. It will be assumed, therefore, in conjunction with the description of a preferred embodiment of our invention, that the device and system will be used in an aircraft having an electrical system supplying direct current at 24 to 38 volts and also 110 volt, 400 cycle, alternating current. Also it will be assumed that fuel, the same fuel used by the aircraft jet engine, will be made available to the purge gas generator at a pressure of at least 160 pounds per square inch gauge. Usually the aircraft fuel supply system maintains a pressure of the order of 550 pounds per square inch. Also it is assumed that air will be made available at a pressure of about 10 pounds per square inch gauge or more from the compressor portion of the jet engine or some other suitable source. Also air is needed for cooling, and this it is assumed will be obtained from a scoop or ram located in the aircraft slip stream in a well known manner.

Since it forms no part of the present invention, no description need be given of the ductwork for distributing the purge gases from the generator to the spaces to be purged. It will be assumed, however, that the aircraft utilizing the equipment to be described has such a system which essentially consists of ducts leading from the generator to spaces within the wings of the aircraft or to other places where fuel vapor might collect. Some of these ducts, of course, lead directly to the aircraft fuel cells. It is assumed further that there will be small outlet venting means for these spaces so as to insure a continuous flow of the purge gas into and from the spaces, thereby sweeping away fuel vapors mixed with an inert atmosphere. Such a system may, if desired, include suitable pressure regulators, relief valves, distribution controlling orifices, and the like as well as the vents mentioned.

Equipment of the character to be described can of course be built to supply purge gases in any reasonable quantity depending upon the conditions met with in the particular aircraft with which the system is used. In the interest of definiteness, however, some of the specific conditions which the equipment described herein was required to meet are given below. One reason for this is that they are illustrative of the rigid requirements imposed upon a system of this character and the great difficulty, therefore, of providing for proper operation within these limitations.

This specific equipment supplies from two to seven and one-half pounds per minute of purge gas at a pressure which must be between eight and one-half and nine and one-half pounds per square inch gauge. This gas must be delivered to the fuel cells and other compartments at temperatures which are not less than 40° F. and not more than 160° F. This high temperature limitation cannot be exceeded, nor can the pressure rise above nine pounds per square inch because of possible damage to the aircraft structure. Less than the minimum pressure indicated will not safely insure proper distribution of the gas and temperatures below that specified might result in freezing of condensed moisture within the system. The equipment operates from sea level to 55,000 feet at least and must start and operate at all temperatures encountered down to —65° F. The air for combustion which is supplied from the compressor of the jet engine may have a pressure as high as one hundred twenty pounds per square inch and a temperature of 500° F. The cooling air, the need for which will be discussed presently, is supplied by a ram within a range which may vary between 62 pounds per minute in level flight to 120 pounds per minute in a dive.

As the description of this apparatus proceeds, other pressures and temperatures will be discussed as well as the necessity for maintaining these temperatures and pressures within specific ranges. The conditions set forth above, however, are the primary ones which influence the equipment.

In order that equipment of this character serve its purpose, the oxygen content of the purge gases supplied must be restricted to a certain maximum under all conditions. In fulfilling this requirement the equipment to be described operates under all of the varying conditions described above without exceeding an oxygen content in the generated purge gases of 3% by volume. Also the corrosive effect of the gases is greatly reduced and sufficient control both of temperature and humidity is exercised to insure that there will be no freezing of condensed moisture in the zones or compartments purged by these gases.

Referring now to the drawings, in Fig. 1 we have shown a diagrammatic layout of the apparatus which forms the subject matter of this invention. In this figure it will appear that the apparatus essentially consists of an arrangement for burning a carefully controlled fuel and air mixture so as to form products of combustion high in carbon dioxide content and low in oxygen, along with an arrangement for subsequently cooling these products of combustion and treating them so as to render them suitable for purging purposes. In this figure the fuel and air mixture is burned and the products of combustion have a preliminary cooling in the apparatus indicated at 10, toward the left hand side of the figure. These hot products of combustion after being partically cooled are passed to a secondary heat exchanger, indicated at 12, where their temperature is reduced to a suitable and controlled level. Air for cooling the two heat exchangers is supplied by a suitable ram and duct not shown to the right hand end of the secondary cooler 12. It passes first through the secondary cooler 12, thence through a tubular transition section 14 to the generator and primary cooler 10. From the left hand of the generator 10 the warm cooling air passes overboard through a suitable duct not shown.

In the interest of general orientation, the control arrangement which is comparatively complex from the standpoint of the heating art, but nevertheless comparatively simple considering its accomplishment, can perhaps best be understood by tracing the fuel and air and the mixture thereof through the system. With this in mind it may be assumed that the pipe indicated at 16 is connected to the compressor section of the aircraft jet engine or some other suitable source of supply of fresh air at a pressure of at least ten pounds per square inch or more. This air for combustion passes through the pipe 16 to an automatic air pressure regulator 18. The purpose of this automatic pressure regulator is to reduce the pressure of the air in the pipe 16 to that at which the main portion of the apparatus functions, it being appreciated as pointed out previously that the pressure of the air at the inlet to the pipe 16 may be over 10 pounds per square inch, whereas on the downstream side of the automatic pressure regulator a pressure is maintained such that the pressure at the outlet of the generator is nine pounds per square inch plus or minus one-half pound.

This automatic pressure regulator can be of any desired type many of which are well known and capable of the performance specified.

From the automatic pressure regulator 18 the air for combustion passes through the tube indicated at 20 and thence through a Venturi portion 22 to an expanding or pressure recovery section 24 which is connected to a fuel air ratio controller 26. This device is sensitive to the pressure differential between the Venturi throat 22 (a tap 28 sensing this pressure) and the higher pressure prevailing at a point upstream of the Venturi 22, this higher upstream pressure being communicated to the instrument by way of the tube 30.

Inasmuch as the pressure taps 28 and 30 will reflect a differential therebetween which is a function of the rate of flow of air through the Venturi section 22 on its way to the burner, this pressure differential can be effective against diaphragms in a well known manner so as to meter the fuel to the burner nozzle to be discussed presently. Essentially the device 26 is a fuel metering control which is altitude compensated so that the amount of fuel delivered to the burner is a direct function of the mass rate of flow of air through the Venturi section 22 rather than being simply a function of the velocity therethrough. This accomplishment is well within the skill of those familiar with aircraft carburetion and needs no special discussion here. It is necessary because with increase in altitude and consequent decrease in air density the velocity rate of flow of the air must increase if the mass rate of flow is to be kept substantially constant. This fuel air ratio controller 26 is illustrated in greater detail in Fig. 4, but its construction and mode of operation need not be discussed inasmuch as its particulars do not form a portion of the subject matter of this invention and devices of this type are well known to those skilled in the art.

Figure 2:
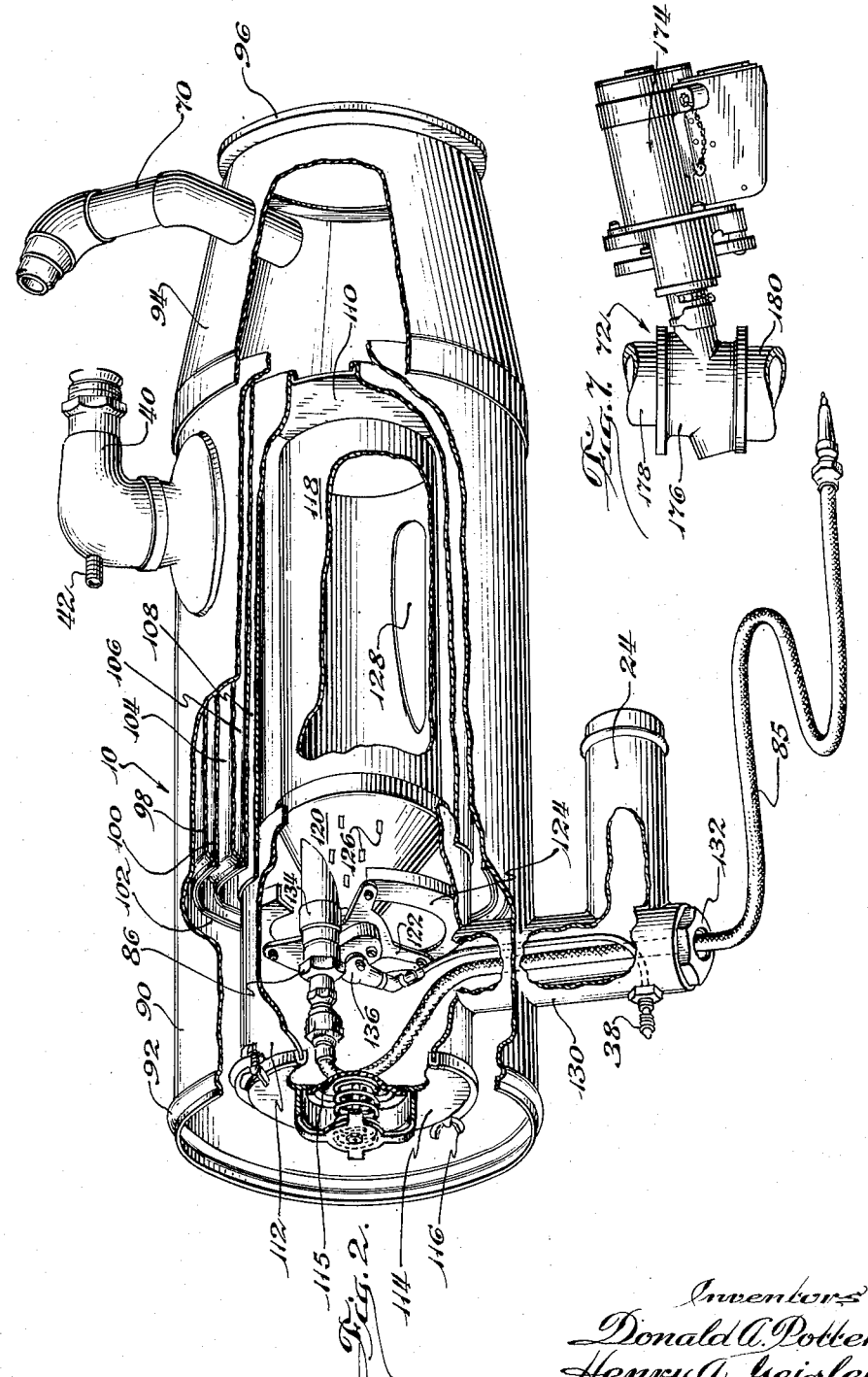
Fig. 2 is a perspective view of a purge gas generator and primary cooler which forms a portion of the apparatus of the present invention. In this view portions of the side wall are broken away so as to illustrate the interior structure.

The air duct 24 continues on the downstream side of the Venturi 22 and is connected to the purge gas generator burner better illustrated in Fig. 2 so as to supply air for combustion thereto. The fuel enters the system by way of the pipe 32 under high pressure from the aircraft power plant fuel system. It passes through a filter 34, an electrically actuated on-off fuel valve 36, an automatic pressure regulator 37, and thence through the fuel air ratio controller 26 which modulates the flow so that the nozzle of the burner will deliver an appropriate quantity of fuel to the burner to track with the rate of air supplied thereto, this fuel passing from the fuel air ratio controller to the burner by way of the tube 38.

From the burner and primary heat exchanger the hot products of combustion which have been reduced in temperature considerably are conducted by way of a duct 40 to the secondary heat exchanger indicated at 12. At the point where the hot products of combustion enter the duct 40 there is a thermostatically actuated detector switch 42, the need for which will appear presently. At the present it is necessary only to understand that this switch is of the single pole, single throw variety and is normally open and closes when the temperature of the hot products of combustion in which its actuating element is submerged reaches 400° F.

Within the secondary heat exchanger 12 the hot products of combustion make several passes, four in series being shown in Fig. 1 and indicated at 44, 46, 48 and 50. From the downstream end of the gas passage through the secondary heat exchanger 12, the last pass 50 is connected to a duct 52 which conducts these tempered products of combustion to a carbon and water separator 54 which serves the function of removing the major portion of the water and carbon from the products of combustion and which additionally has the effect of rendering the products of combustion substantially noncorrosive as will appear. The products of combustion flow from the carbon and water separator to a pressure relief valve 56 and thence through a short duct 58 to a three-way starting valve 93. This diverter valve 93 is electrically operated and serves to pass the generated gases overboard through a branch 95 leading to the transition section 14 during starting and until the gases become of a satisfactory quality. Once the system is in satisfactory operation this valve is actuated to pass the gases to the outlet duct 64. In the event that the pressure in the purge gas line rises above nine pounds—this may happen in a steep climb when the demand is low—the purely mechanical pressure relief valve 56 operates much as any safety valve to protect the fuel cells and other equipment. It also insures that there will be sufficient flow to insure good combustion and proper gas quality under conditions of low demand. It acts to pass the excess gas into a branch duct 70 which also leads to the transition section 14 between the two heat exchangers, the excess gas therefore being passed overboard with the cooling air.

In some installations there may be pressure relief or control valves elsewhere in the system. Under these conditions the relief valve 56 will not be needed to protect against excessive pressures. However, the problem of insuring sufficient flow of combustion air for minimum satisfactory operation of the burner still arises during a climb. For this purpose we have provided a pressure operated minimum flow valve 57 which has its sensing element connected by a tube 59 to the regulated fuel supply at 38. Thus, if the air flow tends to drop too low, this reduces the fuel pressure which tracks with the air mass flow rate. The reduced fuel pressure activates the minimum flow control valve 57 to open position, thus opening a passage 61 between the outlet tube 58 and the transition section 14. The passage 61 is of such size as to insure sufficient air for combustion flowing through the burner even though it is not needed for purging. When the fuel pressure again rises sufficiently, the valve 57 closes.

Under some conditions of operation the temperature of the purge gases may tend to be lower than the desired minimum specified above, and this situation is taken care of by a bypass valve 72 which is connected between the second gas pass 46 through the secondary heat exchanger 12 and the duct 52 connected to the last pass 50. Therefore, when the bypass valve 72 is open, the last two gas passes 48 and 50 of the secondary heat exchanger 12 are short circuited with the result that the products of combustion receive much less cooling. By cycling the valve 72 between its open and closed positions, the temperature of the gases arriving at the carbon and water separator can be controlled within close limits, even though the temperature, density and the rate of flow of cooling air through the heat exchangers will vary throughout a wide range under practical operating conditions.

The air pressure regulator 18 requires a connection to sense the pressure it is to control and this is conveniently made by a tube 74 leading from the pressure regulator 18 to the pressure release valve 56.

In addition to the apparatus described above, it will be seen that Fig. 1 also diagrammatically illustrates an overheat underheat switch 76 which is of the thermostatic type and has its actuating element submerged in the gases passing between the pressure relief valve 56 and the diverter valve 93. The use of this element will be discussed in greater detail presently but it may be said in passing that it has two single pole, single throw switches. One of these, 76B, closes if the temperature rises above 40°, while the other switch, 76A, closes if the temperature rises above 160°. Also present is a cooling air overheat switch 78 which is submerged in the cooling air at the point where it passes from the apparatus, in other words at its hottest point. This switch is normally closed, and opens when the average outlet temperature rises to 400° F. Also shown in Fig. 1 are a pair of electric leads 80 and 82 which are connected to a step-up ignition transformer 74, the output of which is connected by a lead 85 to a spark plug 86 which serves to ignite the fuel and air mixture in the burner. In addition to the above elements there is also a pressure differential switch indicated at 88. This switch is normally open and closes when the pressure differential across its sensing diaphragm rises to that equivalent to three inches of water. It is connected on the high pressure side by a tap 89 to the combustion air line 24 and on its low pressure side by a tap 91 to the generator gas outlet 40. Its purpose is to insure that the rate of flow of combustion air through the burner is sufficiently great to permit placing the apparatus in functioning condition.

There is an on-off combustion air valve 97 and a generator bypass valve 99, both of which are electrically operated. The former shuts off combustion air to the generator while the latter connects ducts 64 and 16 together so as to permit the purged spaces to receive air from the source at 9 p. s. i. g. to maintain pressurization. So as to prevent the equipment from being started before the aircraft is airborne, a single pole, single throw switch 101 is connected to the landing gear, for instance, so as to be open whenever the aircraft is on the ground. It is mechanically connected to close as soon as the landing gear is retracted. Because of the possibility that the regulator 18 may malfunction, there is an excess pressure safety switch 103 which shuts off flow to the equipment if the pressure in the generator rises above 18 p. s. i. g. Its sensing element may be connected as shown to the tap 91. Electrically it comprises a manually reset single pole double throw switch.

Other switches and electrical apparatus forming a portion of the mechanism of the present invention will be introduced and discussed in connection with the description of the operation of the device and the electrical circuits therefor, these other devices being essentially conventional individually and of a well known character, the novelty being in the arrangement for combining these essentially conventional elements to achieve the purpose desired.

Referring particularly to Fig. 2 illustrating the generator and primary cooler, which will be referred to occasionally in the interest of convenience simply as the generator, it will be seen that its outermost element consists of a generally cylindrical sheet metal tube 90 provided at its outlet end with a bead 92 for attachment to a length of duct exhausting outside the aircraft and at its opposite end with a generally conical transition section or adapter 94 having a flange 96 for attachment in turn to the previously referred to transition section 14. This transition section is connected at its opposite end to the secondary heat exchanger 12. When in operation, therefore, cooling air flows into the end 96 of the case shown in Fig. 2 and exhausts from the end equipped with the bead 92.

Within the cylindrical case 90 there is an axially disposed heat exchanger constructed much in the fashion of the one forming the subject matter of Patent No. 2,507,081, issued May 9, 1950, as the invention of George W. Allen and Vernon N. Tramontini, for "Sheet Metal Internal Combustion Heater." In that patent, as in the present device, gas passages are formed as thin annular spaces which have their inlets and outlets on opposite sides. These passages are formed by connecting a pair of concentrically disposed cylindrical sleeves at their ends, and surrounding this structure with a substantial duplicate thereof of larger size to form another similar annular space. These spaces have connections in such fashion that hot products of combustion enter and flow circumferentially through one of the annular spaces in both directions from one side of the space to the opposite side thereof where this space is connected to the next one of larger size such that the hot products of combustion can then flow reversely in both directions circumferentially through the larger space to the opposite side thereof and so on.

With reference to the particular structure shown in Fig. 2, the outermost or largest annular space is formed of concentric sheet metal cylindrical tubes 98 and 100 which are seam-welded together at their ends as indicated at 102 and connected to an outlet fitting for the hot products of combustion. This fitting is indicated at 40 and is the end portion of the duct work indicated by this numeral in Fig. 1 of the drawings. The tubular sleeve 98 is spaced inwardly somewhat from the enclosing shell 90 so as to provide space for cooling air to pass longitudinally between these two members. Inwardly and concentrically within the sleeve 100 is a second annular chamber formed between the concentric shells 104 and 106 which are also seam-welded together at their ends and so arranged that ventilating air can pass between the outermost of the shells 104 and the innermost shell 100 of the first group. As is best shown in the previously referred to patent, there is a connection between the gas space confined by the shells 106 and 104 and the outer gas space confined by the shells 98 and 100 at a position which is substantially opposite the outlet fitting 40; in other words, near the bottom of the device when it is oriented as shown in Fig. 2. Thus hot products of combustion within the space between the shells 104 and 106 can pass through this cross connection at a position near the bottom of the heater into the space between the shells 98 and 100 and then flow in both directions circumferentially to the top of the heater so as to exit through the fitting 40.

Within the innermost of the shells discussed above, that is, the shell 106, and concentric therewith, is another tube 108 which is sealed at one end by a disc 110 and which is connected to the space between the shells 104 and 106 in the manner previously discussed, near the top of the generator.

Toward the left-hand end of the figure, the sleeve 108 is connected to an extension 112 having a tightly fitting removable cap 114, this cap being retained in place by several wing nuts 116 arranged around the periphery thereof. The center of this cap is provided with an outwardly opening spring loaded poppet valve 115 which is designed to open and permit flow from the space within the sleeve extension 112 when the pressure therein rises above about 20 p. s. i. g.

Disposed within the shell 108 is a concentric burner tube 118 provided at its left-hand end with a burner cone 120 secured by a spider 122 to an annular ring 124 secured to the inner surface of the extension 112 at about the position where the extension is joined to the sleeve 108. The burner cone 120 is lanced as indicated at 126 at several locations to permit air for combustion to pass from the chamber within the extension 112 into the combustion chamber which is formed at the outlet end of the burner cone 120.

The sleeve 118 is open at its downstream end and also, to obtain better distribution of the hot gases within the tubular sleeve 108, and to avoid local hot spots, it may be advisable to provide additional openings such as the one indicated at 128 in the side wall of the sleeve 118.

The chamber formed within the extension 112 is connected to a radial tube 130 welded to one side thereof such that this tube 130 passes outwardly through the ventilating air shell 90 and connects to the previously mentioned inlet combustion air duct 24. The previously referred to spark plug wire 85 extends into the tube 130 by way of an airtight packing gland 132, and thence is connected to the spark plug 86 threaded into a tubular fitting 134. This fitting is attached to the burner cone 120 in such position that the inner end of the spark plug, that is, its sparking electrodes, will be within the burner cone 120 and in an appropriate position to ignite the fuel and air mixture therein. The fuel line 38 also extends in an airtight manner through the side wall of the tube 130 and thence passes into the chamber confined within the extension 112 and there is connected to the rearward end of a spray nozzle 136 which extends into the center of the burner cone 120.

With this arrangement, air for combustion enters the fitting 24 and passes inwardly through the tube 130 to the chamber confined within the cylindrical extension 112 and thence passes through the slots 126 in the burner cone 120. Fuel passes by way of the fuel line 38 through the side wall of the tubular member 130 and thence to the spray nozzle 136 so as to direct finely atomized fuel into the combustion chamber at the rearward end of the burner cone 120. This atomized and vaporized fuel is mixed with the combustion air and ignited by the spark plug 86 so as to produce hot products of combustion within the burner tube 118. These products of combustion pass by way of the opening at the downstream end of the burner tube 118 and by way of the slot 128 into the space around the outside of the burner tube 118 but within the shell 108. As previously described, these hot products of combustion then, by way of an interconnecting slot, find their way into the annular space between the shells 104 and 106 and flow circumferentially to the opposite side thereof, where they enter the space between the shells 98 and 100 and flow in the reverse circumferential direction to the outlet fitting 40.

The cooling ventilating air enters the transition section 94 and flows toward the left through the annular spaces provided between the shells 108 and 106 and similarly through the annular space between the shells 104 and 100 as well as through the outer space between the case 10 and shell 98 so as to remove heat from the products of combustion. These several annular cooling streams of air then merge near the left-hand end of the case 90 so as to pass outwardly through the opening which is connected by the bead 92 to the outlet air duct.

Figure 3:
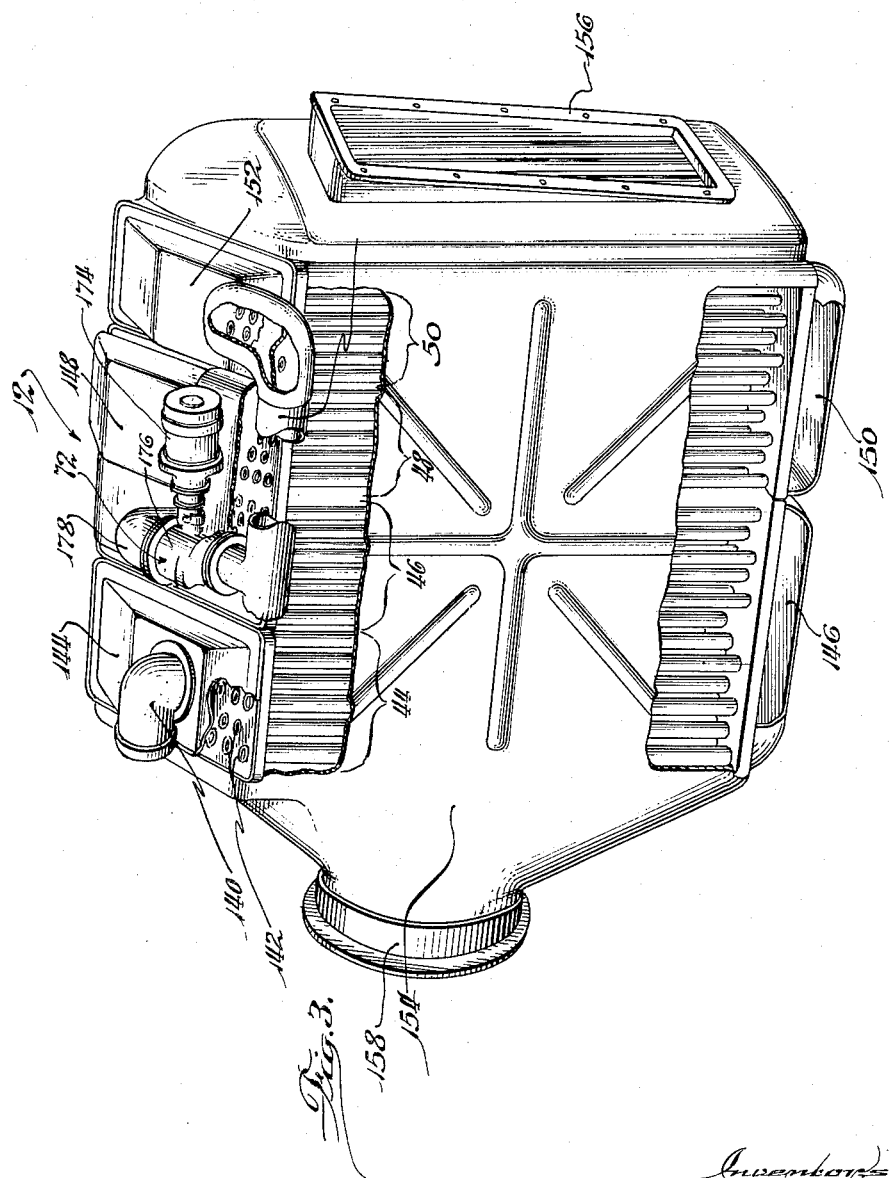
Fig. 3 is a perspective view similar to Fig. 2 illustrating a secondary cooler used with the device of Fig. 2.

As previously mentioned, the tempered hot products of combustion flow from the fitting 40 and duct of the same number in the diagrammatic showing of Fig. 1 to an inlet gas fitting 140 of the secondary heat exchanger 12 best illustrated in Fig. 3. This secondary air cooler is essentially a heat exchanger of the tube bundle type arranged in four passes. The first group, indicated by the numeral 44, consists of a plurality of tubes 142 which extend vertically as shown in Fig. 3, and which conduct the hot products of combustion in parallel from a plenum chamber 144 at the top of the heat exchanger. This chamber 144 is connected to the inlet gas fitting 140. When the products of combustion reach the bottom of the heat exchanger they pass into a plenum chamber 146 which conducts these gases to the next bundle of tubes 46 through which they pass upwardly in parallel to a third plenum chamber 148 which conveys these gases to the open ends of the third group of tubes 48 which extend downwardly and discharge into another plenum chamber 150. The chamber 150 conveys the gases to the last tube bundle 50 where they pass upwardly in parallel to the outlet plenum chamber 152 connected to the outlet fitting 52.

As mentioned earlier, there is a bypass valve 72 which connects the intermediate top plenum chamber 148 to the outlet duct 52 so that when this valve is closed it is necessary for the gases entering the fitting 140 to flow through all four heat exchange passes before reaching the outlet fitting 52, but when this bypass valve is open, most of the gases are short circuited directly from the outlet end of the second tube bundle 46 to the outlet duct 52. By shifting the position of this bypass valve the temperature of the gases reaching the outlet duct 52 can be maintained within the desired range throughout a wide range of operating conditions.

The tube bundle just described is enclosed within a sheet metal air shroud 154 which has a cooling air inlet fitting 156 at the end most closely adjacent to the fourth or outlet tube bundle group 50. It also has an air outlet fitting 158 at its opposite end adapted for connection to the transition section 14 previously mentioned.

The primary heat exchanger and the secondary heat exchanger are shown as being of a different type of construction largely because in the primary heat exchanger the gases are extremely hot and it is necessary, therefore, that the primary heat exchanger be built in such fashion as to resist the high destructive effect of these hot gases. Once the gases have been tempered by passage through the primary heat exchanger, however, the tube bundle type which is more efficient in that it has larger heat exchange surface area, considering its weight and the pressure drop therethrough, is preferred. Under some conditions it may be appropriate within the secondary heat exchanger to take advantage of the fact that the temperature of the gases is reducing with progress through the heat exchanger. By so doing some weight and space saving can be achieved by using a greater number of small tubes in the last two or three passes and a somewhat fewer number of larger tubes in the first or first and second passes. In any event, the hot products of combustion produced by the generator are cooled in two stages by passage through the primary heat exchanger and thence through the secondary heat exchanger with the result that they arrive at the outlet fitting 52 of the secondary heat exchanger at a temperature such that the range previously specified can be achieved through modulation of the diverter valve 72.

From the secondary heat exchanger the products of combustion flow to the carbon and water separator 54 illustrated in greater detail in Figs. 5 and 6. This device is formed of sheet metal and essentially comprises an oval chamber having a tangential inlet fitting 160 parallel to the axis and such that the entering gases are given a rotary or inwardly spiraling component within the chamber as they pass to an axially located outlet fitting 162. Within the device this rotary component is insured by properly located sheet metal baffles 164, with the result that solid and liquid particles having a higher density than the purge gases, collect within a tubular extension 166 located at the opposite end of the device in alignment with the outlet fitting 162. Thus, the solid and liquid particles enter at the fitting 160 and as they spiral inwardly they tend to continue in the same axial direction into the receptacle 166 whereas the gases spiral inwardly and reverse their direction so as to issue from the device by way of the outlet fitting 162 in a direction opposite to that at which they entered. Conveniently, the outlet end of the tubular receptacle 166 can end in a conical member 168 having a central opening 170 leading to a collection chamber 172 which can be cleaned periodically or drained overboard of the aircraft is desired, depending upon its capacity.

Inasmuch as the carbon and water separator removes substantially all of the liquid and solid particles from the purge gases, it also has the effect of removing substantially all of the corrosive elements which are present. This is because these elements are liquids or solids or are soluble in water if of a gaseous nature. The result is that the pH of any condensate which may form upon subsequent cooling of the gases leaving the carbon and water separator is about the same as that of carbonic acid.

Referring to Fig. 7 of the drawings, where the bypass valve is illustrated, it is sufficient to point out that it is comprised of a small reversing electric motor 174 which operates to move a valve element, not shown, within a valve housing 176 so that the position of the valve and thus its influence on the passage through the housing, from the inlet fitting 178 to the outlet fitting 180, is determined by the position of this valve element. Thus by energizing the motor 174 for rotation in either one direction or the other, the position of this valve and thus the pressure drop therethrough can be controlled. The electric circuit for accomplishing control of this device will be discussed presently. Other motor operated valves of similar construction are the combustion air valve 97 and the three-way valve 93.

The fuel air ratio controller is illustrated in Fig. 4 and as pointed out previously is a well known device which needs no particular discussion. It is sufficient to point out that the combustion air enters at the fitting 20, passes through the Venturi portion 22 and then the pressure recovery section 24 and thence to the burner. The pressure differential between the tubes 28 and 30 which are sensitive respectively to the pressure at the Venturi throat and at a point ahead of the Venturi throat, are communicated to a diaphragm chamber at 182. Within this chamber this pressure differential is brought to bear upon sensitive diaphragms which act to modulate a fuel valve within a valve chamber 184 thereby influencing the pressure drop between the inlet and outlet fuel fittings designated respectively by the numerals 186 and 188. This device should be of the type which is also compensated for barometric pressure so that the pressure drop through the fuel valve is essentially a function of the mass rate of flow of air through the Venturi 22 rather than being simply a function of the velocity of the air, it being appreciated that at high altitudes the low density of the air will bring about a greater velocity rate of flow for any assumed mass rate.

The electrical circuit diagram for operating and controlling this apparatus is illustrated in Fig. 8 of the drawings. At the top of the drawing is a pair of terminals indicated by the numeral 200 to which the 28-volt D. C. supply is connected. One of these terminals is grounded, whereas the other is connected to a circuit breaker 202 and thence to a line 204 leading to one of the terminals of the previously mentioned normally open switch 101 which is mechanically connected to be closed when the aircraft is airborne. Conveniently this can be connected to the landing gear in such fashion that the switch is closed when the landing gear is retracted. The purpose of this switch is to place the purge gas generating apparatus out of operation in the event that the aircraft attempts to land without the system having been turned off.

This switch 101 on its output side is connected through the normally closed terminals 105 of the safety pressure switch 103 to one of the terminals 208 of a single pole, single throw, on-off switch 206 available to be manually actuated by one of the crew members of the aircraft. This switch is shown in the "off" position in which the contact 208 is separated from the other contact 212 but to which it is connected when the switch is shifted to the "on" position. The switch contact 105 is also connected by a lead 214 to the shiftable contact 215 of a spring loaded single pole, double throw starting switch 217. This switch is at rest when contact 215 engages contact 219 and is manually actuated to shift contact 215 away from contact 219 and into engagement with contact 221. When released, it returns to the "at rest" position.

The starting switch contact 219 is connected to one of the normally closed contacts, 216, of a gang relay 218. This relay is provided with two sets of normally closed contacts and two sets of normally open contacts which are indicated as follows: 216 and 220 form one normally closed set, and 222 and 224 form a second normally closed set, whereas 226 and 228 are normally open as are 230 and 232. When the coil 234 of this relay is energized, all of these switches change position so that 216 separates from 220, 222 separtes from 224, while 226 makes contact with 228, and 230 makes contact with 222.

The main line 204 ahead of the switch 101 is connected by a branch 242 to the normally open contacts 226 and 230 of the relay 218, while normally open starting switch contact 221 is connected by a lead 240 to the normally closed relay contact 222.

The generator bypass valve is indicated at 99 and is of the type which is normally spring loaded to open position, but which is closed when energized. When deenergized, it returns to open position. One side of the motor element of the valve member 99 is grounded while the other side is connected by a lead 244 to the contact 232 of relay 218.

The combustion air valve 97 at the inlet to the system is driven by an electric motor of the reversing type. One side of this motor 245 is grounded through a lead 246, while the winding for rotating the motor in such direction as to open the valve is connected through a single pole, single throw, switch 248 to a lead 250 connected in turn to contacts 224 and 228 of the relay 218. The other motor lead for rotating the valve in the closing direction is connected through a switch 252 (similar to that indicated at 248) to a lead 254 leading to terminal 220 of the relay 218. The relay terminal 220 is also connected by a line 255 to the normally open contact 223 of the pressure switch 103 for a purpose to appear presently. These switches 248 and 252 are limit switches and are associated with the valve mechanism such that when the lead 250, for instance, is energized, the motor will run in such direction as to open the valve, and when the valve has arrived at the fully open position the switch 248 will be opened so as to deenergize the opening winding. The other switch 252 is operated in the same manner excepting that it is opened by the mechanism whenever the valve arrives at the fully closed position. When the valve moves away from the closed or open position a short distance, whichever switch was open immediately closes.

Near the lower portion of the figure there is illustrated a flame detector relay indicated by the numeral 254. This relay is of the gang type and may be considered as substantially identical to relay 218. It has the following four sets of contacts, which are actuated by the coil 256. Contacts 258 and 260 form one normally closed set, while another normally closed set is made up of contacts 262 and 264. Contact set 266 and 268 is normally open, as is the set comprised of contacts 270 and 272. This relay is connected in the following fashion: Lead 242 is connected by a branch 274 to contacts 260 and 268. Contact 258 is connected by a lead 276 to the single pole, single throw, limit switch 278 at one side of the motor circuit for the three-way starting valve 93. The opposite limit switch 280 of this valve actuating circuit is connected to a lead 282 which in turn is connected to the actuating coil 234 of the relay 218 and also by a branch 284, to contact 266 of the flame detector relay 254.

The circuit for the three-way valve for starting 93 is the same as that for the combustion air valve 97 and no special discussion, therefore, is necessary. It is sufficient to point out that lead 282, which energizes the valve motor through the limit switch 280, is to be energized to shift the three-way valve to such position as to pass the generated gases to the aircraft spaces to be purged. When the opposite lead 276 is energized, valve 93 shifts so as to pass the purge gases overboard of the aircraft. This valve is for the purpose of insuring that gases will not be distributed to the portions of the aircraft to be purged until these gases have reached an appropriate quality. As will appear presently, this valve shifts automatically when the temperature of the purge gases rises to approximately 400° F., this being an indication of stable combustion.

Contacts 262 and 270 of relay 254 are connected together and to a lead 286 which extends to a line 288 connected to contact 212 of the main on-off switch. The lead 286 also extends through the single pole, single throw, normally open, flame detector switch 42 to the coil 256 of the flame detector relay 254. Contact 264 of the flame detector relay is connected to one terminal of a grounded indicator lamp 290, and the remaining flame detector relay contact 272 is connected by a line 292 to the lead 240 at the starting switch contact 221.

The lead 292 is also connected by a branch 294 to one of the contacts of the normally open, single pole, single throw, pressure differential switch 88, and also to one terminal of the coil 296, of an ignition relay 298, the other terminal of coil 296 being grounded. The ignition relay 298 is of the normally open single pole, single throw, type, and serves when energized to connect the 110-volt, 400 cycle terminals indicated at 300 to the primary of the ignition transformer 84, the secondary of which is connected, as mentioned earlier, to the spark plug 86 within the heater combustion chamber. Energization of relay coil 296, therefore, produces sparking at the heater spark plug and this sparking continues so long as relay coil 296 remains energized.

The terminal of the pressure differential switch 88, not connected to lead 294, is connected through the normally closed, cooling air overheat switch 78 to a lead 302 which in turn is connected to one end of a fixed resistor 304, the opposite terminal of which is connected by a lead 306 to the ungrounded terminal of the coil 308 of a normally open, single pole, single throw, fuel valve relay 310. The lead 306 is also connected to ground through the normally open overheat switch 76A which closes whenever the temperature of its actuating element is at 160° F. or thereabove. The contacts 312 of relay 310 are connected one to the lead 288 and the other to a line 314 leading to the ungrounded terminal of the actuating coil 316 of the normally closed fuel valve 36.

The characteristics of the resistor 304 will depend upon the characteristics of the relay coil 308. The purpose of this resistor is to enable the relay coil 308 to be energized or deenergized by the overheat switch 76A even though the lead 302 remains energized. The characteristics are such that, if switch 76A is open and lead 302 is energized, relay coil 308 will still close relay 310 in spite of the voltage drop through the resistor 304. On the other hand if switch 76A is closed, the relay coil 308 is short-circuited, both ends being connected to ground and the resistor 304 acts to limit the current in the lead 302 to a reasonable value.

The circuit is also provided with a relay for the bypass valve, this relay being indicated at 320. It has an actuating coil 322 connected on its ungrounded side to a lead 324 which passes to ground through the underheat switch 76B and also to one terminal of a fixed resistor 326, the other terminal of which is connected to the line 288 and also to contacts 328 and 330 of the relay 320. When the relay coil 322 is deenergized, contact 328 thereof is normally in engagement with its associated contact 334 which is connected by a lead 336 to the single pole, single throw limit switch 338 of the bypass valve 72. This bypass valve has the same construction as the combustion air valve 97 and it is sufficient, therefore, to point out that when lead 336 is energized and limit switch 338 is closed, the valve 72 will be actuated so as to close the bypass. When a lead 340 connected to the other limit switch 342 is energized, and this limit switch is closed, the valve 72 will be actuated so as to open the bypass. The lead 340 is connected to a terminal 344 of the bypass relay 320 which is shown open but which is connected to terminal 330 thereof when the coil 322 is energized.

The resistor 326 serves the same function with respect to relay coil 322 that resistor 304 serves with respect to coil 308, that is, when the line 288 is energized, relay coil 322 will be energized if switch 76B is open, and will be deenergized if switch 76B is closed, by having its actuating element raised in temperature above 40° F., the resistor 326 serving to limit the current in the circuit when switch 76B is closed.

The apparatus operates as follows: When the aircraft is on the ground, switch 101 will be open. The lead 242 will therefore be the only one energized and, since the only closed contacts to which it is connected is the set 258 and 260, current will be supplied to the lead 276 which energizes the three-way starting valve 93 in such fashion as to connect the purge gas generator to the duct leading overboard of the aircraft. As soon as the valve has fully shifted to this position the limit switch 278 will open, thereby deenergizing the circuit completely. Ordinarily this will have happened at the end of the previous cycle as will appear presently.

If now the aircraft becomes airborne, the switch 101 will close thereby supplying power through the pressure switch 103 to the main on-off switch 206 and contact 215 of the spring loaded starting switch 217. Power is therefore supplied through the spring loaded starting switch contacts 215 and 219 to relay contacts 216 and 220 to the lead 254 which closes the combustion air valve 97 in the event that it is not already closed. As soon as it has closed, the limit switch 252 will open, thereby deenergizing this branch of the circuit. Ordinarily this will have occurred at the end of the previous cycle.

As soon as the on-off switch 206 is closed, power will be supplied to lines 288 and branch 286. This energizes relay contacts 262 and 264 and lights the indicator lamp 290 in a position where it can be seen by the operator. Line 288 also is connected by way of the bypass valve relay contacts 328 and 334 to lead 336 which closes the bypass valve 72 after which the limit switch 338 opens so as to leave this valve in closed position. The last above assumes that the underheat switch 76B is above 40° F. and is therefore closed. If its temperature, as it may well be, is below 40°, this switch 76B will be open and relay coil 322 will therefore be energized, with the result that contacts 328 and 334 will be separated, whereas contacts 330 and 344 will be connected together. If the latter is the case, the lead 340 rather than the lead 336 will be energized, with the result that the bypass valve 72 will be placed in the open rather than closed position.

Inasmuch as the generator bypass valve 99 will be deenergized, this valve will be open, with the result that combustion air which flows to the generator during operation will be bypassed around the generator and instead will flow directly to the spaces to be purged. Under the above conditions, therefore, there is no current in the circuit with the exception of that needed by the indicator lamp 290, and that which passes to ground through the resistor 326 alone or in series with coil 322, depending upon the position of switch 76B.

If now the starting switch 217 is depressed and held, contact 215 will shift away from contact 219 and against contact 221. This deenergizes lead 254 and energizes instead the lead 240 which is connected by way of relay contacts 222 and 224 to lead 250 of the combustion air valve 97 with the result that this valve is opened, thereby permitting air to flow to the combustion chamber of the generator as well as through the generator bypass 99. Even with the bypass 99 open, the generator receives enough air for combustion.

Closing contacts 215 and 221 of the starting switch 217 also supplies energy to the lead 292, thereby placing the ignition circuit in operation in the manner previously described, so as to provide sparking at the combustion chamber spark plug 86. Inasmuch as air is flowing through the combustion side of the generator, the pressure differential switch 88 will be closed, and since the temperature is below 400° F. at the cooling air outlet, switch 78 will also be closed. The lead 302 is therefore energized, as is relay coil 308, inasmuch as the temperature at the overheat switch 76A will be below 160° F. Energization of relay coil 308 closes contacts 312, thereby opening the fuel valve 36 by energization of its actuating coil 316.

Inasmuch as fuel and combustion air are now being supplied to the generator, and since the spark plug is sparking, the burner will start into operation inasmuch as the fuel air ratio controller 26 will insure there being a combustible mixture present within the combustion chamber. Under these starting conditions the products of combustion pass overboard by way of the three-way starting valve 93.

As soon as the hot products of combustion raise the temperature of the actuating element of the flame detector switch 42 to 400° F., this switch will close. The flame detector relay coil 256 is therefore energized and shifts the position of its contacts. This deenergizes the indicator lamp 290 and connects the power lead 288 by way of the branch 286 to the lead 292 by way of contacts 270 and 272. A power supply is thus established to the lead 240 connected to contact 221 of the starting switch. The result is that the starting switch can now be released by the operator, so as to shift its contact 215 away from contact 221 and against contact 219 without deenergizing any of the circuit connected to the starting switch contact 221. The ignition system therefore remains in operation and fuel and combustion air continue to be supplied. Engagement of contacts 266 and 268 connects the line 242 by way of branch 274, and these contacts to lead 284 so as to energize relay coil 234 and also the lead 282 to the three-way starting valve 93, the other circuit of which (lead 276) was deenergized by the opening of contacts 258 and 260. Valve 93 therefore shifts so as to pass the products of combustion from the generator to the spaces within the aircraft to be purged, rather than overboard. It is appropriate to make this shift since a temperature of 400° F. at the flame detector switch indicates that the products of combustion are of proper quality for purging purposes.

Energization of relay coil 234 shifts the position of relay 218 and therefore breaks the connection between starting switch terminal 219 and lead 254, with the result that the combustion air valve's closing circuit will not be energized upon the reclosing of starting switch contacts 215 and 219. Combustion air valve 97 remains open, since the opening lead 250 thereof remains energized inasmuch as contacts 222 and 224, which were used for starting, are in parallel with contacts 226 and 228 which close upon energization of the relay 218. The only difference is that upon the closing of contacts 226 and 228, energization for the lead 250 comes directly from the main line 242 rather than by way of the starting switch contacts 215 and 219 and switch 101.

From the above it is apparent that upon closure of the flame detector switch 42 the combustion air valve 97 will remain open, the bypass valve 99 will be closed, it receiving energization from the line 242 by way of relay contacts 230 and 232, and the products of combustion will now be passed to the spaces to be purged rather than overboard, this being accomplished by shifting the position of the three-way valve 93.

The temperature of the purge gases will be controlled by the functioning of the overheat switch 76A and underheat switch 76B. If the temperature falls below 40° F., switch 76B will open, thereby energizing relay coil 322 and connecting relay contacts 330 and 344. This energizes lead 340 and operates the bypass valve 72 to open position after which the limit switch 342 opens so as to permit the valve to remain in this position. Meanwhile separating contacts 328 and 334 deenergizes the bypass valve closing circuit. Inasmuch as the bypass valve opens, thereby short-circuiting a portion of the secondary heat exchanger, the temperature of the purge gases will rise. When the temperature in the gases subsequently rises above 40° F., switch 76B will close thereby deenergizing relay coil 322 and shifting the position of the relay 320 so as to deenergize lead 340 and energize the valve closing circuit represented by the lead 336. The bypass valve therefore cycles between open and closed position so as to maintain the products of combustion reaching its actuating element at a temperature above 40° F.

If the temperature of these gases tends to rise above 160° F. the overheat switch 76A closes, thereby deenergizing relay coil 308 so as to close the fuel valve 36. The flame in the combustion chamber is therefore extinguished because of the lack of fuel until the temperature of the exhaust gases drops below 160° F., whereupon switch 76A reopens so as to reestablish the fuel supply, the combustible mixture thus formed being immediately ignited by the continuously operating ignition circuit.

If for any reason the temperature of the cooling air leaving the apparatus should rise above 400° F., such as may be occasioned by a very rapid climb of the aircraft at relatively low speed, the cooling air overheat switch 78 opens, thereby deenergizing the lead 302 and the relay coil 308, with the result that the fuel valve 36 is closed so as to extinguish combustion. As soon as the temperature drops slightly, however, the cooling air overheat switch 78 will reclose, thereby reestablishing the fuel supply so as to place the burner back in operation. Similraly, any reduction in pressure at the pressure differential switch 88 below three inches of water will cause this switch to open, thereby deenergizing the relay coil 308 and fuel valve coil 316 so as to extinguish combustion until this pressure differential again rises to a satisfactory level, that is, above three inches of water.

The system is placed out of operation by opening the on-off switch 206 so as to separate contacts 208 and 212. This deenergizes line 288 with the result that the fuel valve 36 closes, and flame detector relay 254 returns to the starting position. In addition, the bypass valve 72 is deenergized on both the opening and closing sides and therefore remains in whatever position it last assumed. With the shifting of the flame detector relay 254, the ignition system is deenergized as is line 284. This deenergizes relay coil 234 of the relay 218 and also the switch 280 of the starting diverter valve 93. At the same time the diverter valve lead 276 is energized with the result that the valve motor drives it to such position that the products of combustion from the generator are passed overboard of the aircraft rather than to the spaces to be purged. As soon as the valve arrives in the diverting position, limit switch 278 will open, thereby leaving the valve in this position in preparation for a new cycle.

With the deenergization of relay coil 234, the bypass valve 99 is deenergized with the result that the bypass opens thereby permitting air to be passed to the spaces to be purged. Inasmuch as relay contacts 216 and 220 reclose, the closing circuit of the combustion air valve 97 is reenergized. This valve therefore closes so as to shut off the air at the generator inlet.

If at any time the pressure on the combustion side of the generator becomes excessive, the lock open safety pressure switch 103 will shift so as to deenergize contact 105 and energize contact 223. This turns off the system excepting that the closing circuit for the combustion air valve 97 is energized through leads 255 and 254. This valve therefore closes so as to protect the equipment. If the pressure rises rapidly while the valve 97 is closing, it forces the poppet valve 115 from its seat so as to limit the maximum pressure within the system to 20 p. s. i. g. After the valve 97 has partially closed, the poppet 115 is of course reseated.

It will be appreciated that the combustion air valve 97, since it is of the motor driven type, will not shift its position instantaneously. On the other hand the fuel valve 36 does close immediately, and so air will flow through the combustion side of the generator for a short while after the fuel has been turned off. This will burn any fuel remaining and will sweep out the products of combustion before the combustion side of the apparatus is isolated from the combustion air supply system. The system, therefore, comes to rest cleaned of combustion products and without putting any drain on the aircraft electric system as soon as the combustion air valve 97 and the three-way starting valve 93 have been driven to their starting position.

From the foregoing description it will be seen that this invention fulfills all of the objectives set forth for it, and that it is safe and reliable in operation and remains safe even though portions of the mechanism malfunction or unusual circumstances are encountered. It will also be apparent that modifications and variations may be made in the invention without departing from the scope or spirit thereof and therefore the limits of the invention are to be determined by the scope of the following claims.

Having described our invention, what we claim as new and useful and desire to secure by Letters Patent of the United States is:

1. An aircraft purge gas generator for supplying substantially inert gases to a purge gas duct comprising means forming a combustion chamber for the combustion of a liquid fuel and air mixture, heat exchanger means connected to receive the products of combustion from said combustion chamber, duct means for passing a cooling air stream through said heat exchanger in heat exchange relation to said products of combustion to cool said products of combustion, bypass means connected for short-circuiting a portion of said heat exchanger, valve means for opening and closing said bypass means, means sensitive to the temperature of the products of combustion downstream of said bypass means for opening and closing said valve as the temperature of said temperature sensitive means respectively falls below or rises above a predetermined level, valve means having an inlet connected to receive products of combustion from said heat exchanger means, the last said valve means having a first outlet adapted for connection to said purge gas duct and a second outlet connected to said cooling air stream duct, valve operating means responsive to the temperature of said products of combustion connected for operating the last said valve means to shift the last said valve means to connect its inlet to the first said outlet or in the alternative to connect its inlet to the second said outlet, depending upon whether or not the temperature of said products of combustion at the last said valve operating means is above or below a certain temperature indicative of satisfactory and stable operation of said combustion chamber, and means for supplying fuel and air to said conbustion chamber.

2. An aircraft purge gas generator for supplying substantially inert gases to a purge gas duct comprising means forming a combustion chamber for the combustion of a liquid fuel and air mixture, heat exchanger means connected to receive the products of combustion from said combustion chamber, duct means for passing a cooling air stream through said heat exchanger in heat exchange relation to said products of combustion to cool said products of combustion, valve means having an inlet connected to receive products of combustion from said heat exchanger means, the last said valve means having a first outlet adapted for connection to said purge gas duct and a second outlet connected to said cooling air stream duct, valve operating means responsive to the temperature of said products of combustion connected for operating the last said valve means to shift the last said valve means to connect its inlet to the first said outlet or in the alternative to connect its inlet to the second said outlet, depending upon whether or not the temperature of said products of combustion at a position upstream of said heat exchanger means is above or below a certain temperature indicative of satisfactory and stable operation of said combustion chamber, and means for supplying fuel and air to said combustion chamber.

3. An aircraft purge gas generator for supplying substantially inert gases to a purge gas duct comprising means forming a combustion chamber for the combustion of a liquid fuel and air mixture, heat exchanger means connected to receive the products of combustion from said combustion chamber, duct means for passing a cooling air stream through said heat exchanger in heat exchange relation to said products of combustion to cool said products of combustion, selectively operable means for reducing or increasing the cooling effectiveness of said heat exchanger means, means sensitive to the temperature of the products of combustion downstream of said heat exchanger means to actuate said selectively operable means to increase or decrease the cooling effectiveness of said heat exchanger means as the temperature of said temperature sensitive means respectively falls below or rises above a predetermined level, valve means having an inlet connected to receive products of combustion from said heat exchanger means, the last said valve means having a first outlet adapted for connection to said purge gas duct and the second outlet connected to said cooling air stream duct, means selectively operable to shift the last said valve means to connect its inlet to the first said outlet or in the alternative to connect its inlet to the second said outlet, said selectively operable means comprising a temperature responsive valve shifter sensitive to the temperature of the products of combustion and adapted to shift said valve to open the first said outlet or the second said outlet depending upon whether or not the temperature of said products of combustion at said temperature responsive valve shifter is above or below a certain temperature indicative of satisfactory and stable operation of said combustion chamber, and means for supplying fuel and air to said combustion chamber.

4. In an apparatus for generating inert purge gases to be supplied to a purge gas duct in an aircraft the combination comprising burner means for forming products of combustion, a first heat exchanger connected to reecive products of combustion from said burner means for cooling said products of combustion, a second heat exchanger connected in series with said first heat exchanger to receive products of combustion from said first heat exchanger for additionally cooling said products of combustion, duct means for directing a cooling air stream first through said second heat exchanger and subsequently through said first heat exchanger in series, and automatic valve means connected to receive products of combustion from said second heat exchanger and selectively operable to pass the products of combustion to said purge gas duct or in the alternative overboard of the aircraft, temperature responsive means connected for shifting said automatic valve to pass the products of combustion to said purge gas duct or, in the alternative, overboard of the aircraft depending upon whether or not the temperature of said products of combustion at said temperature responsive means is above or below a certain temperature indicative of satisfactory and stable operation of said burner means, and means for supplying fuel and air to said burner means.

5. In an apparatus for generating inert purge gases for use in aircraft the combination comprising burner means for forming products of combustion, heat exchanger means for cooling said products of combustion connected ot receive products of combustion from said burner means, conduit means for supplying air under pressure to said burner means for combustion therein, a valve for regulating the flow of air through said conduit, said valve being upstream of said burner means, means sensitive to the pressure in said heat exchanger means for closing said valve in the event that said heat exchanger means pressure rises above a certain predetermined level, and an automatic relief valve responsive to the pressure in said heat exchanger for venting said heat exchanger means to the atmosphere, said relief valve being operative at a pressure slightly above the pressure at which said sensitive means closes said first valve.

6. A purge gas generator comprising means forming a sealed combustion chamber and burner for the combustion of a liquid fuel and air mixture, conduit means connected for supplying air to said burner and combustion chamber under pressure, means for supplying fuel to said burner under pressure, means responsive to the mass rate of flow of air through said conduit to variably reduce said fuel pressure to supply an appropriate quantity of fuel to said combustion chamber to track with said air supply, heat exchanger means connected to receive the products of combustion from said combustion chamber, duct means for passing a cooling air stream through said heat exchanger in heat exchange relation to said products of combustion to cool said products of combustion, means forming a vent passage connected for venting said products of combustion from said combustion chamber and heat exchanger to the atmosphere, a valve connected for controlling flow through said vent passage, and pressure responsive means responsive to said fuel pressure for opening said valve when the fuel pressure drops below a certain predetermined minimum indicative of a minimum safe capability of operation of said burner.

7. A purge gas generator comprising means forming a combustion chamber for the combustion of a liquid fuel and air mixture, conduit means for supplying air to said combustion chamber under pressure, means responsive to the mass rate of flow of air through said conduit to supply an appropriate quantity of fuel to said combustion chamber, heat exchanger means connected to receive the products of combustion from said combustion chamber, electrically operated valve means in said fuel supply means, electrically operated valve means in said conduit, electric circuit means connected for closing both said valves when deenergized, pressure sensitive means for deenergizing said circuit if the pressure in said heat exchanger exceeds a predetermined value, temperature sensitive means for deenergizing said circuit if the temperature of the products of combustion rises above a certain predetermined level or falls below a lower predetermined level, flow rate means for deenergizing said circuit if the flow rate through said conduit falls below a certain predetermined level, and independent flow rate responsive means for venting said heat exchanger means to the atmosphere if the flow rate through said conduit falls below another predetermined level, lower than the last said predetermined level.

8. In an apparatus for generating inert purge gases for use in aircraft and intended for connection to duct work leading to spaces to be purged in such aircraft, the combination comprising: sealed burner means for forming products of combustion, means connected to said burner means for receiving said products of combustion and for cooling the same, automatic means for controlling the overall effectiveness of said cooling means so as to regulate the cooling capacity thereof according to the temperature of the products of combustion on the downstream side of said cooling means, gas cleaning means connected to said cooling means to receive cooled products of combustion therefrom and adapted for separating and removing the major portion of liquid and solid particles entrained in said cooled products of combustion, automatic valve means connected to receive cleaned products of combustion from said cleaning means, temperature responsive means disposed to be sensitive to the temperature of the products of combustion connected for operating said valve means, said automatic valve means having a first outlet fitting adapted for connection to said duct work and a second outlet fitting adapted for connection to a conduit leading overboard of said aircraft, said automatic valve means being selectively operable to pass the cooled and cleaned products of combustion to said first fitting or, in the alternative, to said second fitting, depending upon whether or not the temperature of said products of combustion at said temperature responsive means is above or below a certain temperature indicative of satisfactory and stable operation of said burner means, said sealed burner means, said cooling means, said cleaning means, and said automatic valve means comprising a sealed system adapted to withstand an internal pressure of the order of fifteen pounds per square inch gauge, means for supplying air to said sealed burner means at a pressure of the order of ten pounds per square inch gauge, and means for supplying fuel to said sealed burner means.

9. In an apparatus for generating inert purge gases for use in aircraft and intended for connection to duct work leading to spaces to be purged in such aircraft, the combination comprising: sealed burner means for forming products of combustion, means connected to said burner means for receiving said products of combustion and for cooling the same, automatic means for controlling the overall effectiveness of said cooling means so as to regulate the cooling capacity thereof according to the temperature of the products of combustion on the downstream side of said cooling means, automatic valve means connected to receive cooled products of combustion from said cooling means, temperature responsive means disposed to be sensitive to the temperature of the products of combustion connected for operating said valve means, said automatic valve means having a first outlet fitting adapted for connection to said duct work and a second outlet fitting adapted for connection to a conduit leading overboard of said aircraft, said automatic valve means being selectively operable to pass the cooled products of combustion to said first fitting or, in the alternative, to said second fitting, depending upon whether or not the temperature of said products of combustion at said temperature responsive means is above or below a certain temperature indicative of satisfactory and stable operation of said burner means, said sealed burner means, said cooling means, and said automatic valve means comprising a sealed system, means for supplying air to said sealed burner means under pressure, and means for supplying fuel to said sealed burner means.

10. In an aircraft having duct work leading to spaces to be purged, said duct work having an inlet, the combination comprising: sealed burner means for forming products of combustion, means connected to said burner means for receiving said products of combustion and for cooling the same, automatic means for controlling the overall effectiveness of said cooling means so as to regulate the cooling capacity thereof according to the temperature of the products of combustion on the downstream side of said cooling means, gas cleaning means connected to said cooling means to receive cooled products of combustion therefrom and adapted for separating and removing the major portion of liquid and solid particles entrained in said cooled products of combustion, automatic valve means connected to receive cleaned products of combustion from said cleaning means, temperature responsive means disposed to be sensitive to the temperature of the products of combustion connected for operating said valve means, said automatic valve means having a first outlet connected to said duct work inlet and a second outlet leading overboard of said aircraft, said automatic valve means being selectively operable to pass the cooled and cleaned products of combustion to said first outlet or, in the alternative, to said second outlet, depending upon whether or not the temperature of said products of combustion at said temperature responsive means is above or below a certain temperature indicative of satisfactory and stable operation of said burner means, said sealed burner means, said cooling means, said cleaning means, and said automatic valve means comprising a sealed system adapted to withstand an internal pressure of the order of fifteen pounds per square inch gauge, means for supplying air to said sealed burner means at a pressure of the order of ten pounds per square inch gauge, and means for supplying fuel to said sealed burner means.

References Cited in the file of this patent

UNITED STATES PATENTS

| | | |
|---|---|---|
| 2,189,749 | Wendheim et al. | Feb. 13, 1940 |
| 2,254,481 | Harris | Sept. 2, 1941 |
| 2,477,804 | Huber | Aug. 2, 1949 |
| 2,546,013 | Peck et al. | Mar. 20, 1951 |